United States Patent [19]

Booms

[11] Patent Number: 4,525,192

[45] Date of Patent: Jun. 25, 1985

[54] METHOD OF MAKING LEVEL VIALS

[76] Inventor: Herbert Booms, P.O. Box 192, Bad Axe, Mich. 48413

[21] Appl. No.: 561,836

[22] Filed: Dec. 15, 1983

[51] Int. Cl.³ .............................................. C03B 23/08
[52] U.S. Cl. ...................................... 65/110; 65/105; 65/108
[58] Field of Search ................. 65/105, 108, 110, 112; 33/379

[56] References Cited

U.S. PATENT DOCUMENTS

| | | | |
|---|---|---|---|
| 1,867,154 | 7/1932 | Hotchner . | |
| 1,888,635 | 11/1932 | Koenig . | |
| 2,627,121 | 2/1953 | Moyer et al. | 33/211 |
| 2,627,122 | 2/1953 | Moyer et al. | 33/211 |
| 2,646,628 | 7/1953 | Shaler | 33/211 |
| 2,725,683 | 12/1955 | Lockhart | 49/80 |
| 2,790,994 | 5/1957 | Cardot et al. | 65/110 X |
| 2,792,638 | 5/1957 | Pugel | 33/211 |
| 2,918,698 | 12/1959 | Hagen et al. | 18/5 |
| 3,155,477 | 11/1964 | Swarts | 65/110 X |
| 3,183,721 | 5/1965 | Kaynan | 73/371 |
| 3,233,997 | 2/1966 | Moreau | 65/184 |
| 3,311,990 | 4/1967 | Wright | 33/211 |
| 3,923,487 | 12/1975 | Lewis | 65/110 |

FOREIGN PATENT DOCUMENTS 3215667 10/1983 Fed. Rep. of Germany ........ 33/379

Primary Examiner—Arthur Kellogg
Attorney, Agent, or Firm—Basile, Weintraub & Hanlon

[57] ABSTRACT

A method of making level vials includes the steps of heating a hollow glass tube and inserting the heated glass tube to a mold having a plurality of successively arranged mold cavities, each configured to the shape of one level vial having an enlarged, bulbous-shaped central portion and two circular cross-sectional end portions. Next, one end of the glass tube is removably sealed and a pressurized fluid, such as air, is injected into the opposite end of the glass tube, causing the heated glass tube to expand into contact with the walls of the mold cavities to form a plurality of connected vial sections. Apertures are formed, such as by drilling, in each vial section for subsequent filling of each vial with a liquid and a gaseous level indicating bubble. Each vial section is separated by a cutter and the ends of each vial section are sealed by heat from a heat source.

4 Claims, 6 Drawing Figures

# METHOD OF MAKING LEVEL VIALS

BACKGROUND OF THE INVENTION

1. Field of the Invention

This invention relates, in general, to level vials and, more specifically, to methods of making level vials.

2. Description of the Prior Art

Level vials in the form of a sealed glass body containing a liquid and a level indicating gas bubble are well known. Such vials find widespread use in various instruments, such as carpenter's tools, etc., where it is necessary to determine if a surface is level, i.e., either perfectly vertical or horizontal.

Since the majority of currently produced level vials cost only a few cents each to produce, any new method of manufacturing such vials must be fast, inexpensive and subject to minimal waste.

Thus, it would be desirable to provide a method of making level vials which is fast, economical and subject to minimal waste. It would also be desirable to provide a method of making level vials which produces multiple number of vials at one time.

SUMMARY OF THE INVENTION

The present invention is a method of making level vials. According to the present method, an elongated hollow glass tube is heated to a semi-plastic or molten state. The heated glass tube is then inserted into a mold having a plurality of successively spaced and connected mold cavities, each forming one vial section. One end of the glass tube is removably sealed and a fluid, such as air, is injected under pressure into the opposite end of the glass tube to cause the glass tube to expand into contact with the walls of the mold cavity.

After the glass tube is cooled to a hardened state, apertures are formed, such as by drilling, in each vial section. Finally, the vial sections are separated by means of a cutter which separates each vial section from the adjacent vial sections. The ends of each vial section are then sealed by applying heat to each end.

The method of making vial levels of the present invention economically produces level vials. Furthermore, the method of the present invention uniquely enables multiple numbers of vials to be formed at one time thereby minimizing manufacturing costs.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
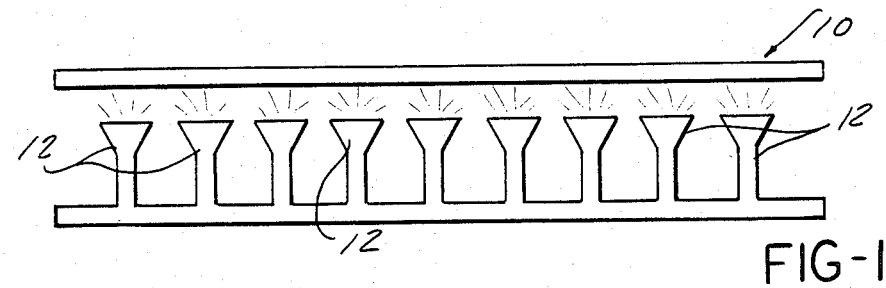
FIG. 1 is a front elevational view of the first heating step of the method of the present invention.

Throughout the following description and drawing, an identical reference number is used to refer to the same component shown in multiple figures of the drawing.

In general, the present invention comprises a method for making level vials, such as barrel-type level vials, in a quick and inexpensive manner. The first step in the method of the present invention is illustrated in FIG. 1 and comprises a step of heating an elongated, hollow glass tube 10. The heating can be pre-formed by any suitable heating means or heat source; although a conventional gas burner having a plurality of orifices 12 is preferred and illustrated in FIG. 1. The glass tube 10 is heated to a semi-plastic or molten state in which it retains its basic shape but is plastic enough to permit molding into a different shape.

Next, the heated glass tube 10 is placed into a mold defined by upper and lower mold halves 14 and 16, respectively. Each mold half 14 and 16 is identically formed with a plurality of successively spaced, connected mold cavities 18, each in the form of one-half of a barrel-type level vial having an enlarged or bulbous center portion 20 located between two circular cross-section end portions 22 and 24.

Figure 2:
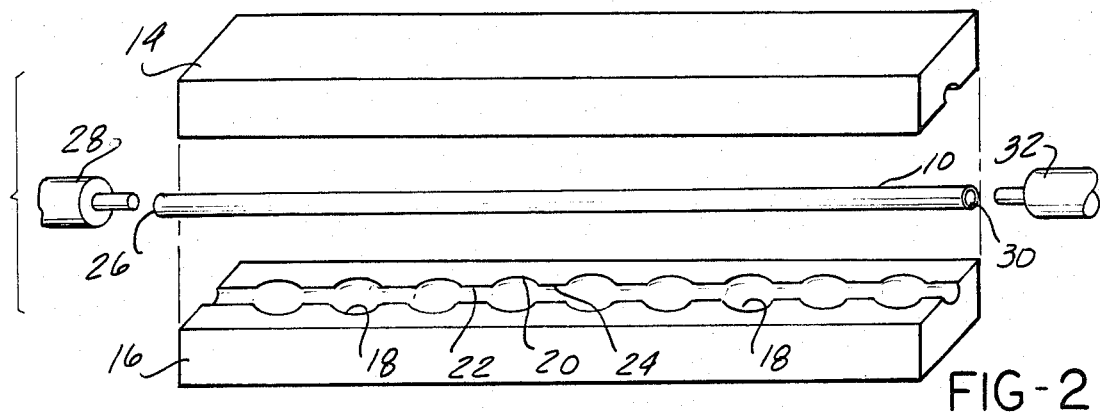
FIG. 2 is an exploded, perspective view of the molding step of the present invention.
Figure 3:
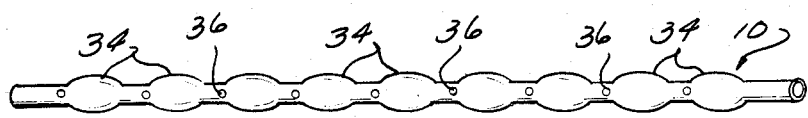
FIG. 3 is a plan view of the elongated glass tube showing the apertures formed in each vial section.

After the heated glass tube 10 is inserted into the mold halves 14 and 16 and the mold halves 14 and 16 have been brought into closed engagement, one end 26 of the glass tube 10 is removably plugged by means of a suitable plug 28. A pressurized fluid, such as air, is injected into the opposite end 30 of the hollow glass tube 10 through a nozzle 32 shown in FIG. 2. The pressurized fluid causes the heated glass tube 10 to expand into contact with the walls of the mold cavities 18 to form a series of connected vial sections 34 having an enlarged or bulbous center portion and two circular cross-sectional end portions.

The glass tube 10 is then removed from the mold and allowed to cool to a hardened state. Next, apertures 36 are formed in each vial section 34 by any suitable means. Preferably, the apertures 36 are formed in each vial section 34 by a plurality of drills, not shown. The apertures 36 provide an inlet for injecting a liquid, such as water, alcohol or glycerine, etc. and a gaseous level indicating bubble into each vial section 34.

Figure 4:
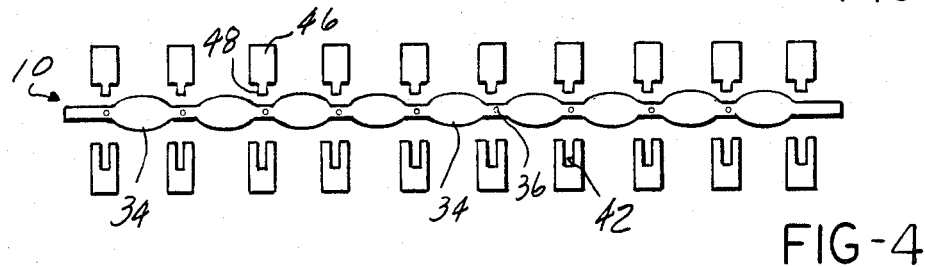
FIG. 4 is a front elevational view of the cutting step of the present invention.
Figure 5:
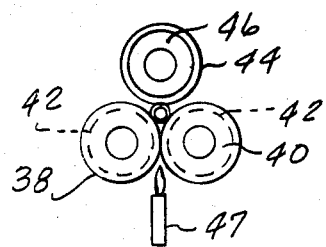
FIG. 5 is an end view of the cutting apparatus shown in FIG. 4.

Next, the vial sections 34 are separated. Preferably, the hollow glass tube 10 molded to form a plurality of connected vial sections 34, as shown in FIGS. 4 and 5 is mounted on two cylindrical rods or rollers 38 and 40. Each of the rods 38 and 40, for each vial section 34, includes a centrally located recessed portion 42 which is configured to receive the outwardly extending cutting tip 44 of one of a plurality of cutting wheels 46 as the cutting tip 44 passes through the end of each vial section 34.

The cutting wheels 46 may have any suitable configuration; however, in a preferred embodiment each cutting wheel 46 has a circular cross-section with a centrally located annular cutting tip 44. While rotating, each cutting wheel 46 is lowered into engagement with the molded glass tube 10 adjacent one end of each vial sections 34, as shown in FIG. 4 to separate each vial section. Sealing of the ends of each vial section 34 is also effected by additional heat produced from a suitable heat source 47, such as a gas torch, which is positioned between each set of rollers 38 and 40 below the glass tube 10.

Figure 6:
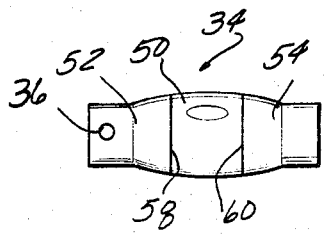
FIG. 6 is a plan view of a level vial formed according to a method of the present invention.

The end result, as shown in FIG. 6, is a barrel-type level vial 34 having an enlarged, bulbous-shaped central portion 50 positioned between two, circular cross-sectional end portions 52 and 54. An aperture 36 is located in one end of the portion, such as end portion 52, of each level vial 34.

As is conventional, level indicating marks, such as annular bands 58 and 60, are placed on the level vial 34 at the ends of the central portion 50. In addition, after the fluid and gaseous level indicating bubble have been inserted through the aperture 36 into the level vial 34, the aperture 36 in each vial 34 is sealed by suitable means, such as by placing a small amount of solder over the aperture 36 to sealingly close the aperture 36.

In summary, there has been disclosed an unique method of making level vials. The method of the present invention is both inexpensive and fast thereby producing low-cost level vials. Furthermore, multiple numbers of level vials are formed in each manufacturing operation thereby minimizing the manufacturing costs of making each level vial.

What is claimed is:

1. A method of making level vials comprising the steps of:

heating an elongated, hollow glass tube;

inserting the heated glass tube into a mold having a plurality of successively spaced, connected mold cavities;

removably sealing one end of the glass tube;

injecting a fluid into the opposite end of the glass tube to expand the glass tube into contact with the walls of the mold cavities thereby simultaneously forming a plurality of vial sections having interconnected, open ends;

simultaneously forming an aperture in each vial section;

simultaneously separating the vial sections; and simultaneously sealingly closing the open ends of each vial section.

2. The method of claim 1 wherein the step of separating each vial section is performed by a cutter and the step of sealingly closing the open ends of each vial section is performed by heating the ends of each vial section.

3. The method of claim 1 further including the step of:

filling each vial section with a liquid and gaseous level indicating bubble through the aperture; and sealingly closing the aperture in each vial section.

4. The method of claim 1 wherein the step of forming an aperture in each vial section is performed by drilling the aperture in the vial section.

* * * * *